United States Patent
Barham

(10) Patent No.: US 7,502,913 B2
(45) Date of Patent: Mar. 10, 2009

(54) SWITCH PREFETCH IN A MULTICORE COMPUTER CHIP

(75) Inventor: Paul R. Barham, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 11/454,245

(22) Filed: Jun. 16, 2006

(65) Prior Publication Data

US 2007/0294516 A1  Dec. 20, 2007

(51) Int. Cl.
*G06F 9/30* (2006.01)
(52) U.S. Cl. ..................................... 712/214
(58) Field of Classification Search ................ 712/214, 712/225
See application file for complete search history.

(56) References Cited

U.S. PATENT DOCUMENTS

| | | | | |
|---|---|---|---|---|
| 5,440,707 A | | 8/1995 | Hayes et al. ................ 395/403 |
| 5,490,280 A | * | 2/1996 | Gupta et al. .................. 712/23 |
| 5,627,984 A | * | 5/1997 | Gupta et al. ................ 712/200 |
| 5,689,674 A | * | 11/1997 | Griffith et al. ............... 712/217 |
| 5,748,937 A | * | 5/1998 | Abramson et al. ........... 712/218 |
| 5,802,569 A | | 9/1998 | Genduso et al. ............. 717/137 |
| 5,809,275 A | | 9/1998 | Lesartre ..................... 395/392 |
| 5,974,523 A | * | 10/1999 | Glew et al. ................... 712/23 |
| 6,128,703 A | | 10/2000 | Bourekas et al. ............ 711/138 |
| 6,272,520 B1 | * | 8/2001 | Sharangpani et al. ....... 718/108 |
| 6,341,347 B1 | * | 1/2002 | Joy et al. .................... 712/228 |
| 6,446,143 B1 | | 9/2002 | Razdan et al. ................ 710/29 |
| 6,507,862 B1 | * | 1/2003 | Joy et al. .................... 718/107 |
| 6,542,991 B1 | * | 4/2003 | Joy et al. .................... 712/228 |
| 6,694,347 B2 | * | 2/2004 | Joy et al. .................... 718/108 |
| 6,751,706 B2 | | 6/2004 | Chauvel et al. ............. 711/122 |
| 6,801,997 B2 | * | 10/2004 | Joy et al. .................... 712/229 |
| 6,978,350 B2 | | 12/2005 | Birk et al. ................... 711/133 |
| 6,993,630 B1 | | 1/2006 | Williams et al. ............ 711/137 |
| 7,310,705 B2 | * | 12/2007 | Yoshida et al. .............. 711/122 |
| 2002/0078122 A1 | * | 6/2002 | Joy et al. .................... 709/102 |
| 2002/0138717 A1 | * | 9/2002 | Joy et al. .................... 712/235 |
| 2003/0191927 A1 | * | 10/2003 | Joy et al. .................... 712/228 |
| 2004/0015683 A1 | | 1/2004 | Emma et al. ................ 712/240 |
| 2004/0162971 A1 | * | 8/2004 | Joy et al. .................... 712/228 |
| 2004/0215886 A1 | | 10/2004 | Cargnoni et al. ............ 711/135 |
| 2005/0125802 A1 | * | 6/2005 | Wang et al. ................. 718/108 |
| 2005/0138628 A1 | | 6/2005 | Bradford et al. ............ 718/107 |

(Continued)

OTHER PUBLICATIONS

Free On-Line Dictionary of Computing. ©1999. www.foldoc.org search term: operating system.*

(Continued)

*Primary Examiner*—Aimee J Li
(74) *Attorney, Agent, or Firm*—Woodcock Washburn LLP

(57) ABSTRACT

Systems and methods for switch prefetch in multicore computer chips can allow a programmer to tailor operations of a computer program to available data. Control-flow decisions can be made by the program based on the availability of data in a cache. For example, a new instruction in a processor instruction set can receive a list comprising pairs of data addresses and code addresses. The processor can look for data items corresponding to the listed data addresses, and find the first available data item in the cache. When a cached data item is found, control is transferred to the code address supplied in the table. If no data is in the cache, then the processor can stall until the most quickly fetched data item is available.

15 Claims, 8 Drawing Sheets

U.S. PATENT DOCUMENTS

2005/0210204 A1*  9/2005  Yamazaki ................... 711/145
2006/0026594 A1*  2/2006  Yoshida et al. .............. 718/100

OTHER PUBLICATIONS

Lim, B.-H., et al., "Limits on the performance benefits of multithreading and prefetching," *SIGMETRICS '96*, 1996, 37-46.

Oliver, R.L., et al., "Dynamic and adaptive cache prefetch policies," *IEEE Xplore*, http://ieeexplore.ieee.org/search/freesrchabstract.jsp?arnumber=830357&isnumber=7967&, downloaded from the Internet on Apr. 7, 2006, 1 page.

Roth, A., et al., "Effective jump-pointer prefetching for linked data structures," *IEEE*, 1999, 111-121.

Shrewsbury, D.W., et al., "Reducing the impact of software prefetching on register pressure," *SAC'00*, 2000, 767-773.

* cited by examiner

SWITCH PREFETCH IN A MULTICORE COMPUTER CHIP

BACKGROUND

Moore's Law says that the number of transistors we can fit on a silicon wafer doubles every year or so. No exponential lasts forever, but we can reasonably expect that this trend will continue to hold over the next decade. Moore's Law means that future computers will be much more powerful, much less expensive, there will be many more of them and they will be interconnected.

Moore's Law is continuing, as can be appreciated with reference to FIG. 1, which provides trends in transistor counts in processors capable of executing the x86 instruction set. However, another trend is about to end. Many people know only a simplified version of Moore's Law: "Processors get twice as fast (measured in clock rate) every year or two." This simplified version has been true for the last twenty years but it is about to stop. Adding more transistors to a single-threaded processor no longer produces a faster processor. Increasing system performance must now come from multiple processor cores on a single chip. In the past, existing sequential programs ran faster on new computers because the sequential performance scaled, but that will no longer be true.

Future systems will look increasingly unlike current systems. We won't have faster and faster processors in the future, just more and more. This hardware revolution is already starting, with 2-8 core computer chip design appearing commercially. Most embedded processors already use multi-core designs. Desktop and server processors have lagged behind, due in part to the difficulty of general-purpose concurrent programming.

It is likely that in the not too distant future chip manufacturers will ship massively parallel, homogenous, many-core architecture computer chips. These will appear, for example, in traditional PCs and entertainment PCs, and cheap supercomputers. Each processor die may hold fives, tens, or even hundreds of processor cores.

In a multicore system, processors may store and read data from any number of cache levels. For example, a first cache may be accessed and modified by only a single processor, while a second cache may be associated with a small group of processors, and a third cache is associated with a wider group of processors, and so on. A problem with such a configuration is that cache access becomes dramatically more expensive, in terms of processor clock cycles, as caches are farther away from the accessing processor. A search for desired data in a "level one" cache can be conducted relatively quickly, while a search of a "level two" cache requires much more time, and a "level three" search may require a relatively enormous amount of time, when compared to the time necessary for level one or level two searches. Therefore, tailoring the amount of time spent on memory access is a problem that will increasingly emerge in the computing industry.

SUMMARY

In consideration of the above-identified shortcomings of the art, the present invention provides systems and methods for switch prefetch in multicore computer chips. In one exemplary embodiment, a programmer may tailor operations of a computer program to available data by making control-flow decisions based on the availability of data in a cache. A new instruction in a processor instruction set (referred to herein as a "module") can receive a list comprising pairs of data addresses and code addresses. The module can look for the listed data, and find the first available data in the cache. When a cached data item is found, control is transferred to the code address supplied in the table. If no data is in the cache, then the processor can stall until the most quickly fetched data item is available. Other embodiments, features and advantages of the invention are described below.

BRIEF DESCRIPTION OF THE DRAWINGS

The systems and methods for switch prefetch in a multicore computer chip in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In modern computer chips, level two cache misses generally take several hundred processor cycles to satisfy. Main memory systems are often composed of multiple banks and memory controllers configured to safely reorder cache fetches to make best use of underlying memory systems. Thus it can be very difficult to predict how long it will take to satisfy a cache miss. One solution to this problem is to provide prefetch instructions which allow the programmer to tell the memory system that a cache line will be needed before the processor has to stall waiting for the data. Such approaches may be used in tandem with the solutions proposed here.

A "switch prefetch" is described herein which allows more sophisticated control over memory access activity. In one embodiment, as provided above, a programmer can make control-flow decisions based on the availability of data in the cache. A processor can discover which of a plurality of data items is available in a shortest interval, and immediately execute a corresponding instruction. In another embodiment, for example, a processor stall interval can be specified. The processor will stall and wait for retrieval of desired data, but only for the duration of the stall interval. After the interval is elapsed, the processor may proceed to other tasks.

Figure 1:
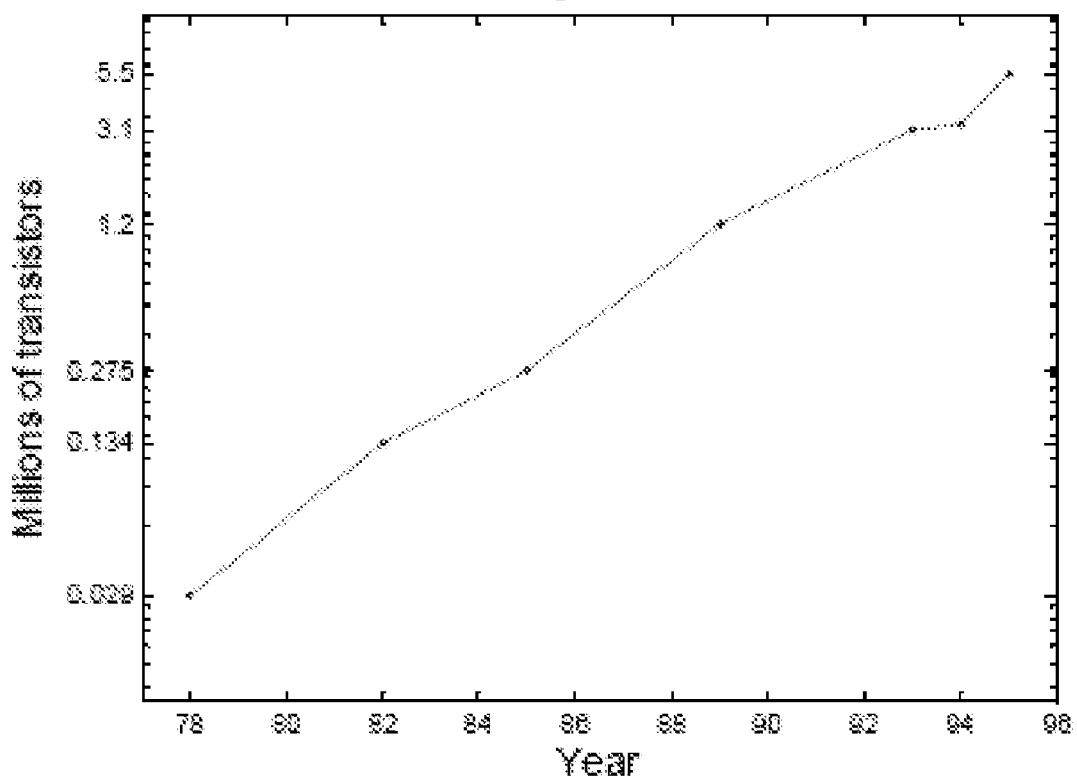
FIG. 1 illustrates trends in transistor counts in processors capable of executing the x86 instruction set.
Figure 2:
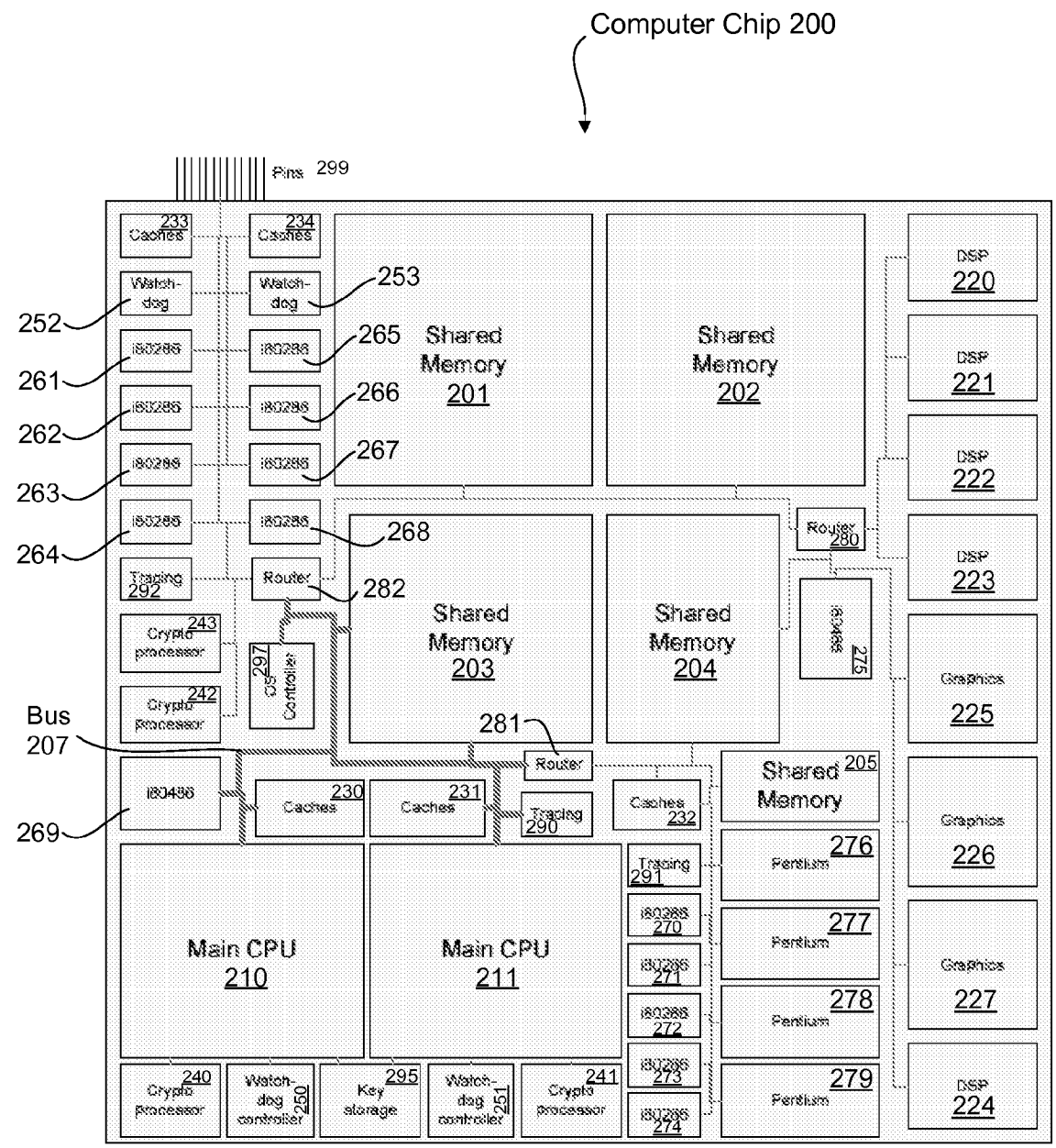
FIG. 2 illustrates a multicore computer chip that comprises a variety of exemplary components such as several general purpose controller, graphics, and digital signal processing computation powerhouses.

FIG. 2 gives an exemplary computer chip 200 that comprises a wide variety of components. Though not limited to systems comprising chips such as chip 200, it is contemplated that aspects of the invention are particularly useful in multicore computer chips, and the invention is generally discussed in this context. Chip 200 may include, for example, several general purpose controller, graphics, and digital signal processing computation powerhouses. This allows for maximum increase of localized clock frequencies and improved system throughput. As a consequence, system's processes are distributed over the available processors to minimize context switching overhead.

It will be appreciated that a multicore computer chip 200 such as that of FIG. 2 can comprise a plurality of components including but not limited to processors, memories, caches, buses, and so forth. For example, chip 200 is illustrated with shared memory 201-205, exemplary bus 207, main CPUs 210-211, a plurality of Digital Signal Processors (DSP) 220-224, Graphics Processing Units (GPU) 225-227, caches 230-234, crypto processors 240-243, watchdog processors 250-253, additional processors 261-279, routers 280-282, tracing processors 290-292, key storage 295, Operating System (OS) controller 297, and pins 299.

Components of chip 200 may be grouped into functional groups. For example, router 282, shared memory 203, a scheduler running on processor 269, cache 230, main CPU 210, crypto processor 240, watchdog processor 250, and key storage 295 may be components of a first functional group. Such a group might generally operate in tighter cooperation with other components in the group than with components outside the group. A functional group may have, for example, caches that are accessible only to the components of the group.

In general, processors such as 210 and 211 comprise an "instruction set" which exposes a plurality of functions that can be executed on behalf of applications. Because the term "instruction" is used herein to refer to instructions that an application gives to a processor, an "instruction" in a processor's instruction set will be referred to herein as a "module."

Figure 3:
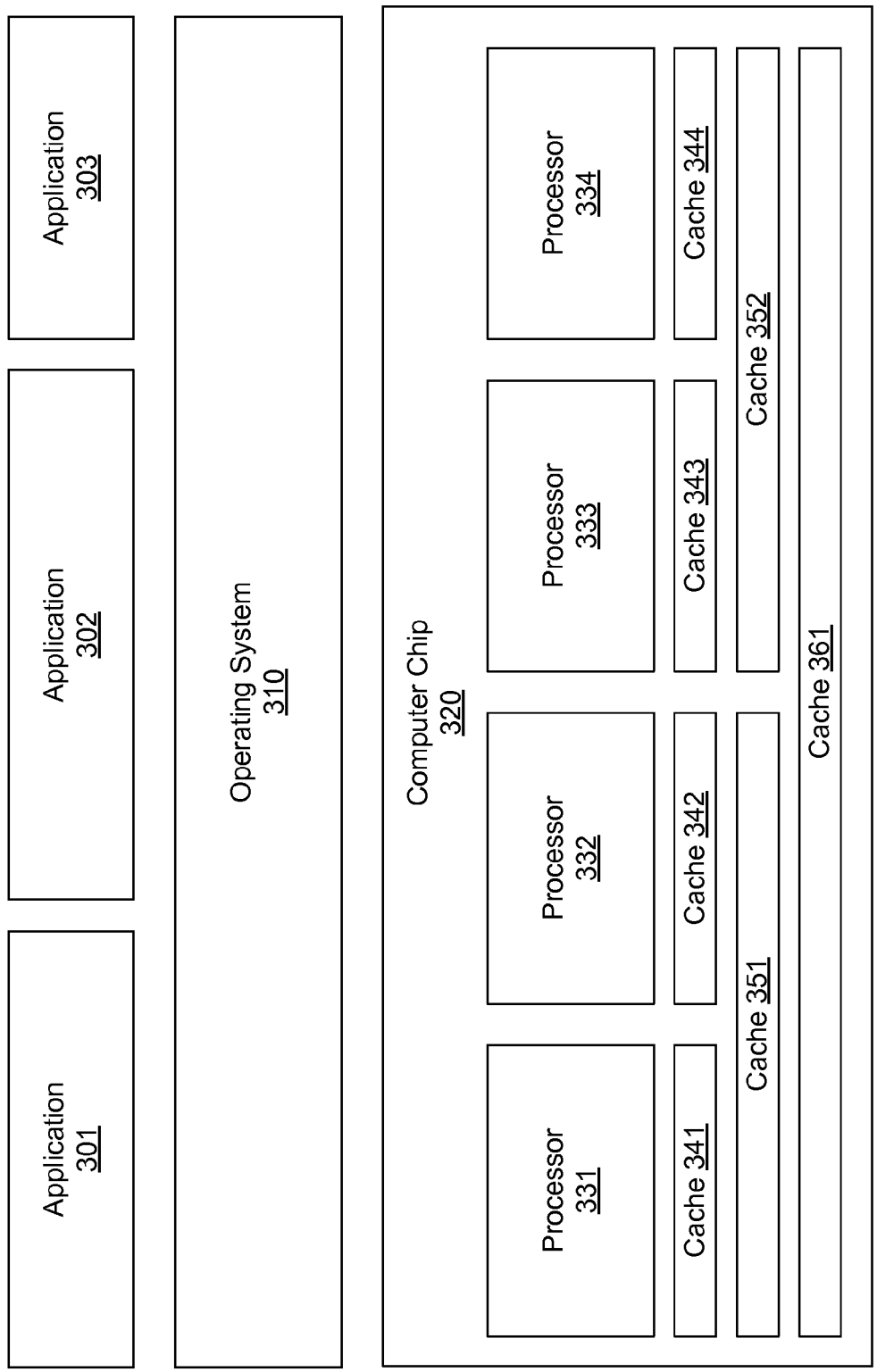
FIG. 3 illustrates an overview of a system with an application layer, and OS layer, and a multicore computer chip.

FIG. 3 illustrates an overview of a system with an application layer, and operating system (OS) layer, and a multicore computer chip. The OS 310 is executed by the chip 320 and typically maintains primary control over the activities of the chip 320. Applications 301-303 access hardware such as chip 320 via the OS 310. The OS 310 manages chip 320 various ways that may be invisible to applications 301-303, so that much of the complexity in programming applications 301-303 is removed.

A multicore computer chip such as 320 may have multiple processors 331-334 each with various levels of available cache. For example, each processor 331-334 may have a private level one cache 341-344, and a level two cache 351 or 352 that is available to a subgroup of processors, e.g. 331-332 or 334-334, respectively. Any number of further cache levels may also be accessible to processors 331-334, e.g. level three cache 361 which is illustrated as being accessible to processors 331-334. The interoperation of processors 331-334 and the various ways in which caches 341-344, 351-352, and 360 are accessed may be controlled by logic in the processors themselves, e.g. by one or more modules in a processor's instruction set. This may also be controlled by OS 310 and applications 301-303.

Data items may be stored in caches 341-344, 351-352, and 360. Typically, data items are identified by the addresses at which they reside in the main memory. The data logically resides at those addresses in main memory, but copies of the data may also reside in one or more caches 341-344, 351-352, and 360. Depending on the cache-coherency protocol in use, the caches may also contain modified data items which have not yet been written back to main memory.

Processor instructions usually access data items of several different sizes up to the native "word-size" of the machine (e.g. 32 or 64-bits). Processors contemplated by the invention may identify the "effective address" of data items in any of the ways presently used by processor load and store instructions, or any future developed such technique.

Caches 341-344, 351-352, and 360 are typically divided into a number of fixed sized entries called cache-lines. These will frequently be larger than the word-size of the machine, e.g., 64/128 bytes. To keep track of which data items are in a cache, the cache typically remembers the address from which the data item(s) in each cache-line originally came. Each cache line usually has a 'tag' which records the address of the data held in that cache line.

Figure 4:
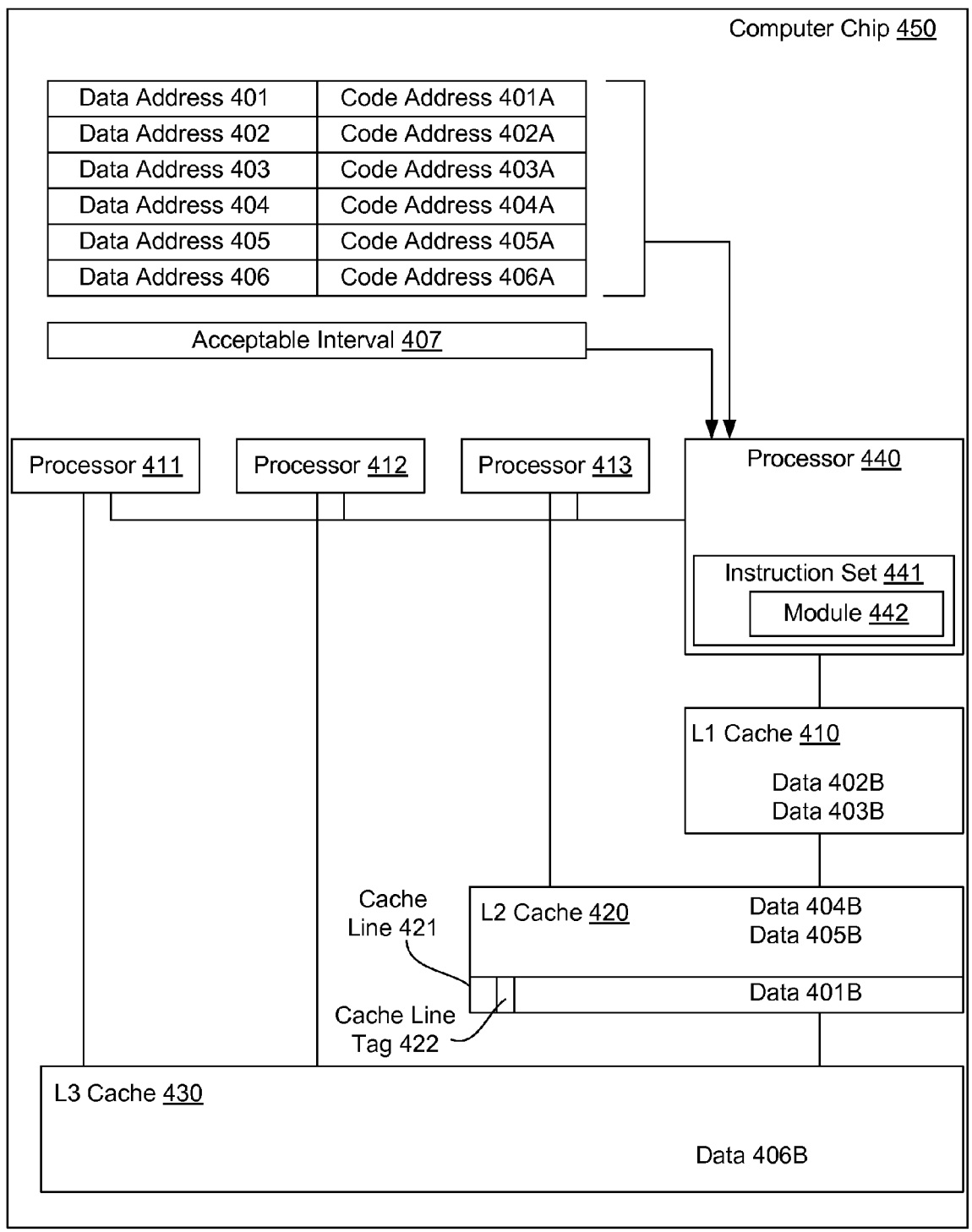
FIG. 4 illustrates a chip 450 with a processor 440 accepting data addresses 401-406 and corresponding code addresses 401A-406A. The processor 440 looks for the data 401B-406B identified by addresses 401-406 in the various caches 410, 420, 430, and once it finds a first data, e.g. data 402B (in the claims, this is the data available in a shortest interval), the processor 440 executes code at the corresponding code address 402A.

FIG. 4 illustrates a chip 450 with a processor 440 accepting data addresses 401-406 and corresponding code addresses 401A-406A. The processor 440 looks for the data items 401B-406B in the various caches 410, 420, 430, and once it finds a first data item, e.g. data item 402B (the data item available in a shortest interval), the processor 440 executes code at the corresponding code address 402A.

FIG. 4 illustrates a computer chip 450 comprising at least one processor 440, said processor 450 comprising an instruction set 441 and at least one cache 410. A module 442 in said instruction set 441 accepts a plurality of data addresses 401-406 and a plurality of corresponding code addresses 401A-406A. The module 442 then finds a first available data item—here, 402B—in said at least one cache 410. The module 410 transfers control of said processor 440 to a code address—here, 402A—corresponding to said first available data item 402B.

It can be appreciated that computer chip 450 may comprise a plurality of processors 411-413 in addition to processor 440, and a plurality of caches, 420, 430 in addition to the at least one cache 410.

In another embodiment of the invention, which is also illustrated in FIG. 4, and which may be deployed independently or in conjunction to the aspects discussed above, the module 442 in said instruction set 441 accepts an acceptable interval 407 for fetching at least one of said data items 401B-406B. The module 442 returns to said processor 440 without finding said at least one data item (e.g. 406) cannot be found within said interval 407. The interval 407 may be specified by the computer program executing on processor 440, such as an operating system or an application, or, in other embodiments, may be hard-wired into the processor 440 logic itself.

In FIG. 4, L2 cache 420 is illustrated with a cache line 421 in which data item 410B is located. Processor 440 may identify that data item 401B is in cache line 421 by reading cache line tag 422. Such details are familiar to those of skill in the art and it will be appreciated that data items 401B-406B will be found in cache lines such as 421.

Figure 5:
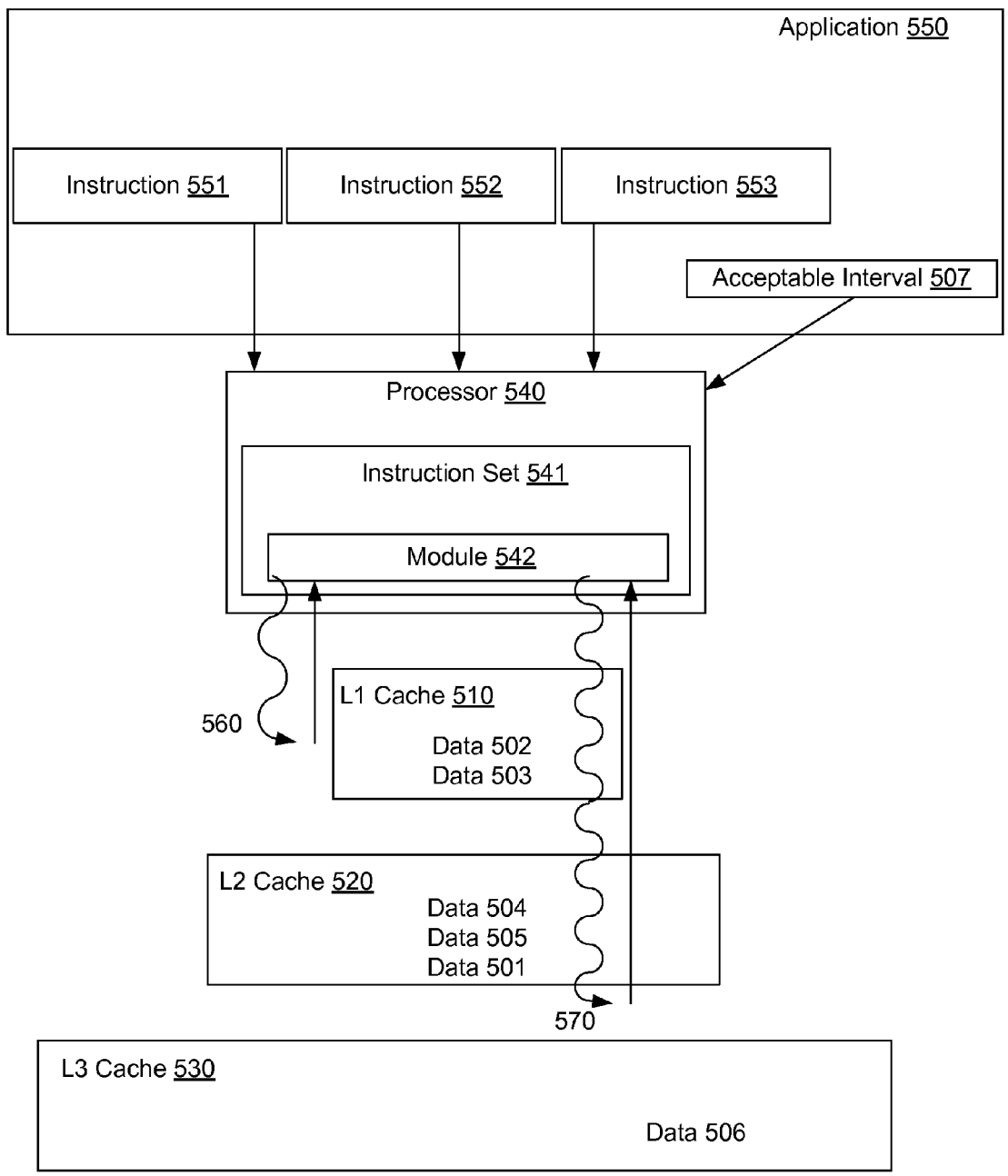
FIG. 5 illustrates an application 550 that has some instructions 551-553 that need executing. Application 550 gives instructions 551-553 to processor 540, along with an acceptable interval 507. The processor 540 looks in caches 510, 520, 530 for the data 501-506 it needs to execute the instructions 551-553. Processor 540 will execute instructions based on the data that are discoverable during the acceptable interval.

FIG. 5 illustrates an application 550 that has some instructions 551-553 that need executing. Application 550 gives instructions 551-553 to processor 540, along with an acceptable interval 507. The acceptable interval can be passed to module 542 in instruction set 541. The processor 540 looks in caches 510, 520, 530 for the data item 501-506 it needs to execute the instructions 551-553. Processor 540 will execute instructions based on the data items that are discoverable during the acceptable interval 507.

For example, consider a scenario in which instruction 551 needs data addresses 502 and 503, instruction 552 needs data address 501, and instruction 553 needs addresses 504, 505, and 506. A first acceptable interval 507 allows enough time 560 to search L1 cache 510. Processor 540 looks for addresses 501-506, and retrieves addresses 502 and 503 during the available time 506. Processor 540 then executes instruction 551, and not instructions 552 or 553.

In another example, processor 540 is given an acceptable interval corresponding to an amount of time 570 sufficient to search L1 Cache 510 and some or all of L2 Cache 520. In such a scenario, processor may go on to execute instructions 551 and 552, but not instruction 553 because instruction 553 requires data item 506, and data item 506 was not found in the acceptable interval 507 corresponding to available time 570. If the data items for instruction 551 are found first, then instruction 551 can be executed first, which may cause processor 540 to move on to other activities rather than executing instruction 552. Alternatively, instruction prioritization processes may be utilized that intelligently determine which of the instructions 551 or 552 that may possibly execute should be executed first.

Figure 6:
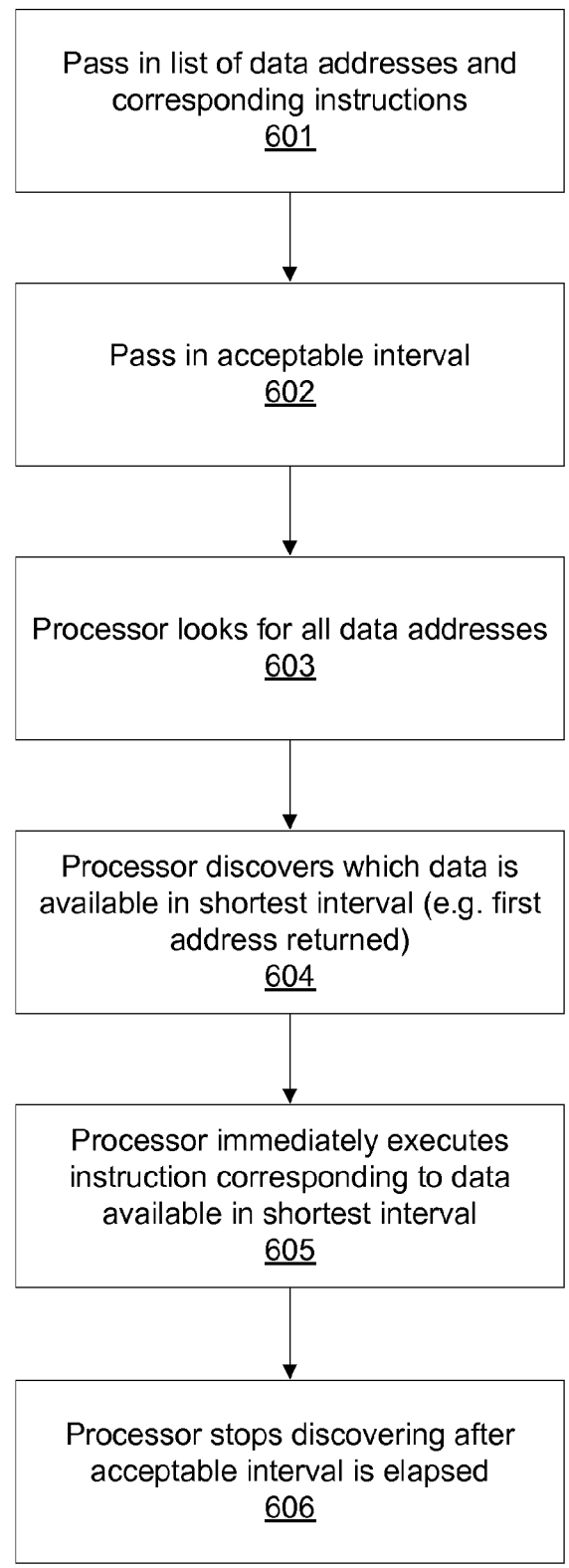
FIG. 6 illustrates a method for fetching data for a processor in which a plurality of addresses are provided to a processor, the processor finds first available data, and executes code corresponding to the first available data.

FIG. 6 illustrates method for fetching data for a processor, comprising passing in a list of data addresses and corresponding instructions 601, passing in an acceptable interval 602, initiating a lookup of the listed data items 603, discovering by the processor which data item is available in shortest interval (e.g. first address returned) 604, immediately executing by the processor the instruction corresponding to data available in the shortest interval 605, and stopping processor discovering after the acceptable interval is elapsed 606.

Steps 601 and 602 may, in one embodiment, entail the passing of a list of data addresses and code addresses, and/or an acceptable interval by a computer program such as an application or an operating system. Step 603 can entail a processor initiating a search for specified data items by, for example, issuing a command to a memory subsystem. The processor can stall while waiting for return of the specified data items. It should be noted that there are a wide variety of storage media and memory management techniques. For example, addresses may be virtual or physical memory addresses, and memory may be a cache or other memory location that is configured according to any technologies allowing for storage and retrieval of data.

Step 604 entails discovering, by a processor, which of a plurality of data items is available in a shortest interval. In one embodiment, the data item that is available in a shortest interval can be the item corresponding to the first information returned to the processor. Such a data item is available in the shortest interval by virtue of the fact that it was available faster than other data items.

The processor may immediately execute at least one instruction corresponding to at least one data item that is available in said shortest interval 605. For example, once a data item is returned to a processor, it can immediately look in the list of data addresses and corresponding instructions, and immediately execute one or more instructions corresponding to the returned data item. "Immediately executing" an instruction therefore means that the processor undertakes execution of the instruction without waiting for other data items to be returned to the processor. There may be certain necessary preliminary actions to take prior to executing an instruction, and "immediate execution" does not preclude taking such preliminary actions.

If the acceptable interval is elapsed prior to finding any of the specified data items, the processor can stop waiting and move on to other tasks 606. This option may be available in some settings and not others. For example, there may be security reasons to force a processor to stall until certain instructions may be executed. If this is the case, the acceptable interval can be extended indefinitely until such instructions can be executed. Alternatively, the acceptable interval can be deactivated so that the processor temporarily functions without the acceptable interval constraint.

Some embodiments of the invention may allow for discovery of a variety of data items prior to moving to execution of corresponding instructions. In such embodiments, instructions are not executed immediately upon return of data items. Instead, the processor waits for the entire duration of a specified interval, for example, prior to moving to code execution. Instructions may next be executed on a "first available" basis or pursuant to a more intelligent prioritization scheme.

One exemplary more intelligent prioritization scheme can comprise making control flow decisions based on whether data is modified, owned exclusively, or shared with other processors, i.e., based on the state of a cache-coherency protocol. This in turn could be extended into a primitive which allows a processor to wait for the first of several memory locations to be modified by another processor, i.e., the basis of a inter-processor synchronization mechanism.

In another embodiment, the processor may immediately execute an instruction, and allow the memory subsystem to continue searching for information while such instruction is being executed. It may then subsequently execute other instructions corresponding to other data items in an order corresponding to duration of interval required to discover said other data items.

Figure 7:
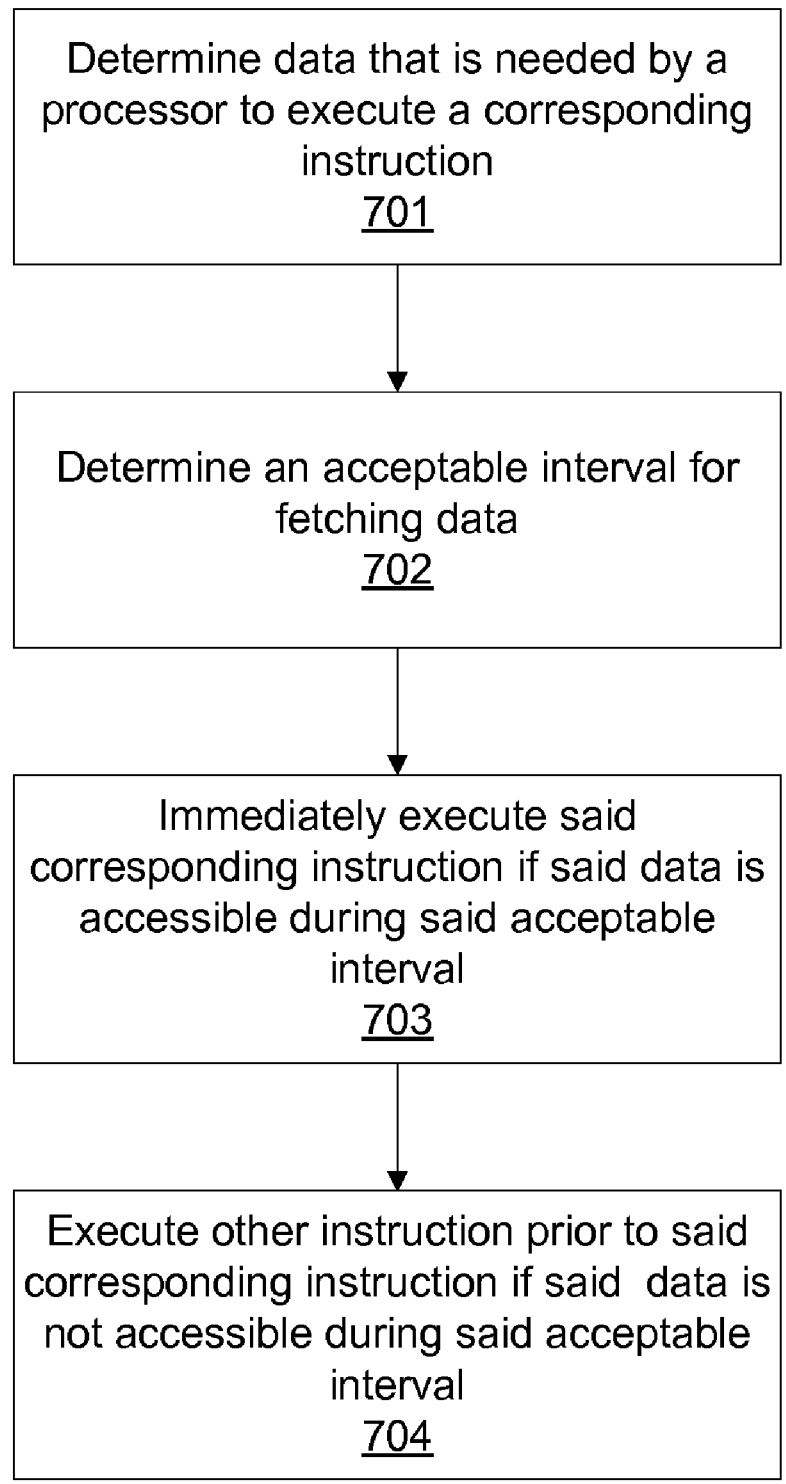
FIG. 7 illustrates a method for fetching data for a processor in which an address is provided to a processor along with an acceptable stall interval. The processor can wait for the acceptable interval, execute any code corresponding to retrieved data, and move on to other tasks.

FIG. 7 illustrates a method for fetching data for a processor, comprising determining at least one data item that is needed by said processor to execute at least one corresponding instruction 701, determining an acceptable interval for fetching said at least one data item 702, immediately executing said at least one corresponding instruction by said processor if said at least one data item is accessible during said acceptable interval 703, and executing at least one other instruction prior to said at least one corresponding instruction if said at least one data item is not accessible during said acceptable interval 704.

The steps of determining at least one data item 701 and determining an acceptable interval 702 for fetching information may be carried out pursuant to software instructions in an application. The application may be, for example, an operating system.

Immediately executing said at least one corresponding instruction 703, once again, refers to initiating the appropriate actions needed to execute such corresponding instruction, not necessarily actually executing the instructions. In other words, the at least one corresponding instruction is executed prior to the other instructions corresponding to other data items.

If said at least one data item is accessible during said acceptable interval, it may be immediately executed. If not, the processor may move on to execute some other instruction 704. For example, the processor may have other work to do on behalf of the current process or some other process, and can undertake such work while a memory subsystem proceeds to attempt to locate the specified data items.

In one embodiment, said at least one corresponding instruction can comprise a plurality of corresponding instructions, said at least one data item can comprise a plurality of data items, and said plurality of corresponding instructions may be executed in an order corresponding to duration of interval required to discover said plurality of data items. Alternatively, some other intelligence may determine which instructions are executed first, and some of the instructions may not be executed at all.

Figure 8:
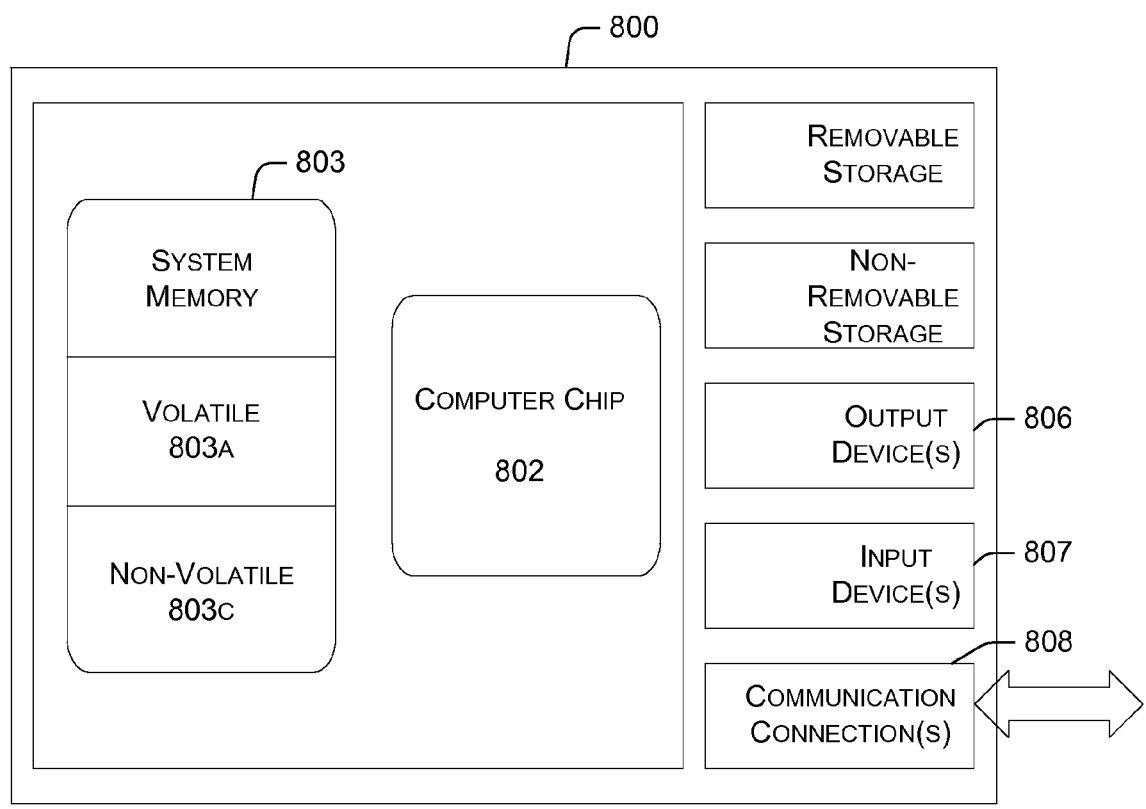
FIG. 8 illustrates various aspects of an exemplary computing device in which the invention may be deployed.

FIG. 8 illustrates an exemplary computing device 800 in which the various systems and methods contemplated herein may be deployed. An exemplary computing device 800 suitable for use in connection with the systems and methods of the invention is broadly described. In its most basic configuration, device 800 typically includes a processing unit 802 and memory 803. Depending on the exact configuration and type of computing device, memory 803 may be volatile (such as RAM), non-volatile (such as ROM, flash memory, etc.) or some combination of the two. Additionally, device 800 may also have mass storage (removable 804 and/or non-removable 805) such as magnetic or optical disks or tape. Similarly, device 800 may also have input devices 807 such as a keyboard and mouse, and/or output devices 806 such as a display that presents a GUI as a graphical aid accessing the functions of the computing device 800. Other aspects of device 800 may include communication connections 808 to other devices, computers, networks, servers, etc. using either wired or wireless media. All these devices are well known in the art and need not be discussed at length here.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, cell phones, Personal Digital Assistants (PDA), distributed computing environments that include any of the above systems or devices, and the like.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method for fetching data for a processor of a plurality of processors on a multi-processor computer chip, comprising:
    receiving, by a first processor of said plurality of processors, a list comprising at least one data address and a corresponding code address, wherein the at least one data address of the list may be executed in any order without affecting a result of a program corresponding to the at least one data address;
    receiving, by said first processor, a processor instruction to execute the data address in the list available in a shortest interval;
    determining, by said first processor, the data address in the list that the processor may begin executing in a shortest interval; and
    executing, by said first processor, at least one instruction corresponding to the code address corresponding to the at least one data address that is available in the shortest interval.

2. The method of claim 1, wherein said computer chip comprises a plurality of caches.

3. The method of claim 1, wherein said determining is conducted during an acceptable interval for fetching said at least one data address.

4. The method of claim 3, further comprising stopping said determining after said acceptable interval, wherein at least one data address was not discovered during said acceptable interval.

5. The method of claim 1, wherein the step of determining is carried out pursuant to a software instruction in an application.

6. The method of claim 5, wherein said application is an operating system.

7. The method of claim 1, further comprising subsequently executing, by said processor, said corresponding plurality of instructions in an order corresponding to duration of interval required to discover said plurality of data addresses.

8. A method for fetching data for a processor of a plurality of processors on a multi-processor computer chip, comprising:
    receiving a list comprising at least one data address and a corresponding code address, wherein the at least one data address of the list may be executed in any order without affecting a result of a program corresponding to the at least one data address;
    receiving a processor instruction to access the data address available in a shortest interval;
    determining, by said first processor, the at least one data address in the list that the processor may begin executing in a shortest interval;
    determining an acceptable interval for fetching said at least one data address;
    immediately executing at least one code instruction corresponding to the code address by said first processor if said at least one data address is accessible during said acceptable interval;
    executing at least one other instruction prior to said at least one code instruction if said at least one data address is not accessible during said acceptable interval.

9. The method of claim 8, wherein said computer chip comprises a plurality of caches.

10. The method of claim 8, wherein said at least one code instruction comprises a plurality of code instructions, wherein said at least one data address comprises a plurality of data addresses, and wherein said plurality of code instructions are executed in an order corresponding to duration of interval required to discover said plurality of data addresses.

11. The method of claim 8, wherein the steps of determining the at least one data address and determining an acceptable interval for fetching information are carried out pursuant to software instructions in an application.

12. The method of claim 11, wherein said application is an operating system.

13. A computer chip comprising a plurality of processors, at least one of said processors comprising:
- a processing unit;
- an instruction set, comprising an instruction directing said processing unit to access a list comprising at least one data address and code address pair and determine the data address available in a shortest interval, wherein the at least one data address of the list may be executed in any order without affecting the result of a program corresponding to the data address;
- at least one cache;
- wherein, when the processing unit processes the instruction, it finds a first available data address in said at least one cache, wherein said first available data address is most proximal to said processing unit, then transfers control of said processing unit to the code address corresponding to said first available data address.

14. The computer chip of claim 13, wherein said computer chip comprises a plurality of caches.

15. The computer chip of claim 13, wherein said module in said instruction set accepts an acceptable interval for fetching at least one of said at least one data address, and returns to said processor without finding said at least one data address if said at least one data address cannot be found within said interval.

* * * * *